Patented Nov. 1, 1932

1,885,653

UNITED STATES PATENT OFFICE

LUDWIG VAN ZÜTPHEN, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY

PROCESS OF POLYMERIZING HYDROCARBONS OF THE BUTADIENE SERIES

No Drawing. Application filed December 24, 1929, Serial No. 416,306, and in Germany January 9, 1929.

The present invention relates to a process of polymerizing hydrocarbons of the butadiene series.

Various processes are already known for polymerizing hydrocarbons of the butadiene series by means of sodium, so as to form caoutchouc-like substances.

I have now found that there can be used for the polymerization sodium powder in a finely homogeneous distribution in a solid diluent, such as, for instance, a metallic salt; this expedient produces a very uniform course of the reaction and the very uniformly polymerized products thus obtained constitute a caoutchouc of high value.

The quantity of sodium to be used is very small. The reaction is suitably carried out in a stationary pressure vessel, at a temperature of between about 10° C. and about 70° C. The optimum lies between 35° C. and 45° C. The quantity of the sodium metal may vary within wide limits; about 0.3 to 1.5 per cent of the weight of the hydrocarbon which is used is suitable. The concentration of the sodium metal with regard to the solid diluent may also be widely varied, for instance about 1/40–1/20 of the weight of the diluent.

The following example illustrates the invention, but it is not intended to limit it thereto, the parts being by weight:

1.5 parts of sodium in the form of wire or ribbon and 60 parts of dry sodium chloride are treated in a ball mill in an atmosphere of nitrogen until a homogeneous, finely powdered mixture is produced. This mixture is heated to 35° C. to 40° C. in a pressure vessel together with 240–270 parts of butadiene until the latter has disappeared. The product is worked up in such a manner that the caoutchouc which is formed is separated from the salt mass containing sodium, this being an easy operation; for removing the sodium which possibly might adhere to the caoutchouc the latter is treated with alcohol and then with water.

The reaction may also be carried out at room temperature, but it then occupies a correspondingly longer time.

Potassium chloride, anhydrous sodium sulfate or dry pumice stone powder may also be used instead of sodium chloride as a diluent for the sodium. In such case the method of working is the same as that described in the example.

I claim:

1. Process of polymerizing hydrocarbons of the butadiene series which consists in treating the hydrocarbon with a homogeneous mixture of metallic sodium and an indifferent solid diluent in the form of powder.

2. Process of polymerizing hydrocarbons of the butadiene series which consists in treating the hydrocarbon with a homogeneous mixture of metallic sodium and an indifferent solid metallic salt in the form of powder.

3. Process of polymerizing hydrocarbons of the butadiene series which consists in treating the hydrocarbon with a homogeneous mixture of metallic sodium and solid sodium chloride in the form of powder.

4. Process of polymerizing butadiene which consists in treating butadiene with a homogeneous mixture of metallic sodium and an indifferent solid diluent in the form of powder.

5. Process of polymerizing butadiene which consists in heating butadiene to 10° C. to 70° C. in a pressure vessel together with a homogeneous mixture of metallic sodium and solid sodium chloride in the form of powder.

6. Process of polymerizing butadiene which consists in heating butadiene to 35° C. to 45° C. in a pressure vessel together with a homogeneous mixture of metallic sodium and solid sodium chloride in the form of powder.

In testimony whereof, I affix my signature.

LUDWIG VAN ZÜTPHEN.